United States Patent Office.

ELIAS M. WRIGHT, OF CASTILE, NEW YORK; ASSIGNS ONE-HALF TO GARDNER HERRICK, OF ALBION, MICHIGAN.

Letters Patent No. 94,165, dated August 24, 1869.

IMPROVEMENT IN WASH-BOILERS.

The Schedule referred to in these Letters Patent and making part of the same.

Be it known that I, ELIAS M. WRIGHT, of Castile, in the county of Wyoming, in the State of New York, have invented new and useful Improvements on Clothes-Washers; and I do hereby declare that the following is a full, clear, and exact description of the construction and operation of the same, reference being had to the annexed drawings, making a part of this specification, in which—

Figure 1 is a perspective view of the washer complete;

Figure 2, a perspective view of the same without the covers;

Figure 3, a section view of the washer;

Figure 4, a perspective view of the concave piece; and

Figure 5, a perspective view of the middle steam-chamber.

The nature of my invention consists in providing a steam-chamber, A, in the middle of the washer, dividing it into two compartments; in providing the two compartments of the washer with concave bottoms B, so that the clothes may be rolled over readily; in providing the steam-chambers, in the middle and ends, (or sides,) with the holes E G F, in such a manner that the steam will press through them upon the clothes, in such direction as will cause the clothes to rotate; also, in providing the steam-chamber A in the middle of the washer, with the divisions I, to separate the steam for the holes F in the lower part of the chamber, from that to be forced from the holes E in the upper part of the chamber; also, in providing the upper part of the washer with two covers b c, so that the space between them forms a chamber for condensing the steam; and also in providing a chamber, D, or its equivalent, having one or more pipes running through it to condense steam, and convey the water, which shall gather in the chamber between the two covers b and c, to the body of water in the bottom of the washer.

The object of my invention is to heat the clothes from the middle as well as from the outside, thereby economizing the heat; also to arrange the holes E G F, so that the steam ejected will rotate the clothes; also to condense the steam by means of the chamber between the covers b and c, and by means of the chamber D; and also to return all that is condensed to the water in the bottom of the washer by means of the chamber D.

To enable others skilled in the art to make and use my invention, I will proceed to describe its construction and operation.

I construct my washer of tin, sheet-copper, or any other metal commonly used for such purposes, and place in the middle a steam-chamber, A, dividing the washer into two compartments, and at each end (or side) a half circular concave, leaving a space between it and the end (or side) piece for a steam-chamber, the concave extending across the bottom of the washer to the lower part of the middle chamber.

I construct the steam-chambers with holes arranged in such manner that the steam will be forced out, so as to give the clothes a rotating motion. The steam from the holes F, in the lower part of the middle chamber, forcing the clothes up from the inside, the steam from the holes E, in the upper part of the middle chamber, forcing them over and outward to the ends, (or sides,) and the steam from the holes G, in the upper part of the end (or side) chambers, pressing the clothes downward and under.

I extend the sides of the middle chamber A directly downward to the surface of the water, forming the part I, to separate the steam for the holes F from that generated for the holes E.

I construct the concave B in the bottom of the two compartments, with holes H, to let the water through to the under sides of the concaves, and cover the under sides of the holes with a strip to prevent the steam from escaping upward.

I construct the washer with two covers, b and c, having a space between, forming a chamber to condense the steam.

I also construct my washer with a chamber, D, or its equivalent, having one or more pipes running through it to convey cold air to condense steam, and convey, through the holes i, the water formed in the chamber between the covers b and c to the water in the bottom of the washer, through the holes a.

What I claim as my invention, and desire to secure by Letters Patent, is—

The construction and arrangement of the middle steam-chamber A, the end-chambers with concave bottoms B B, the circulating-holes E F G, and the two covers with the outside chamber D, all substantially as and for the purpose herein specified.

ELIAS M. WRIGHT.

Witnesses:
WM. L. EATON,
G. F. GREEN.

A. Avery.
Stretching and Drying Cloth.
N° 94,166. Patented Aug. 24, 1869.
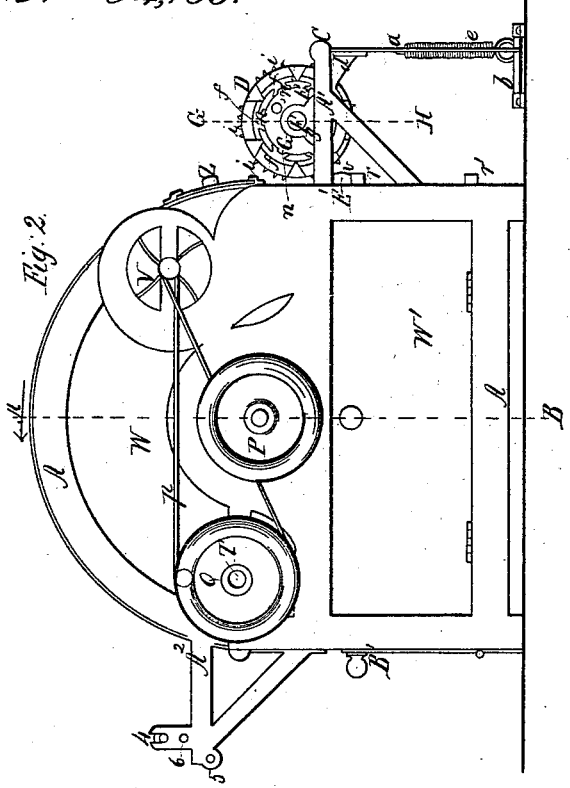
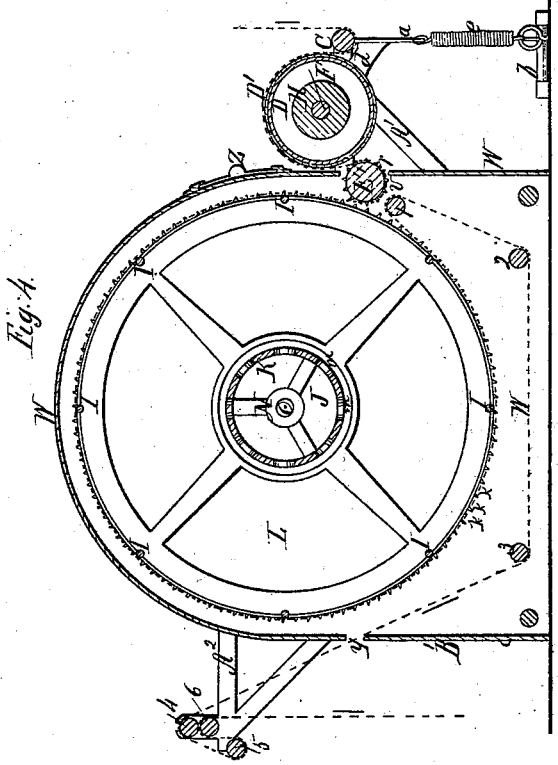
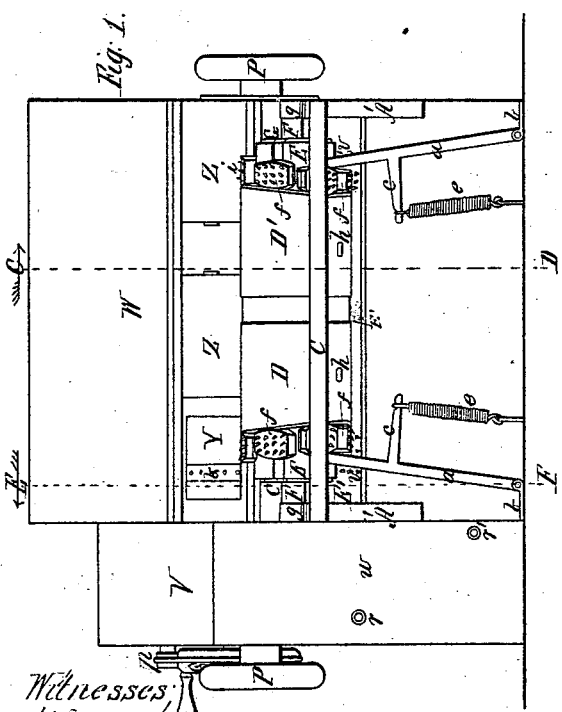
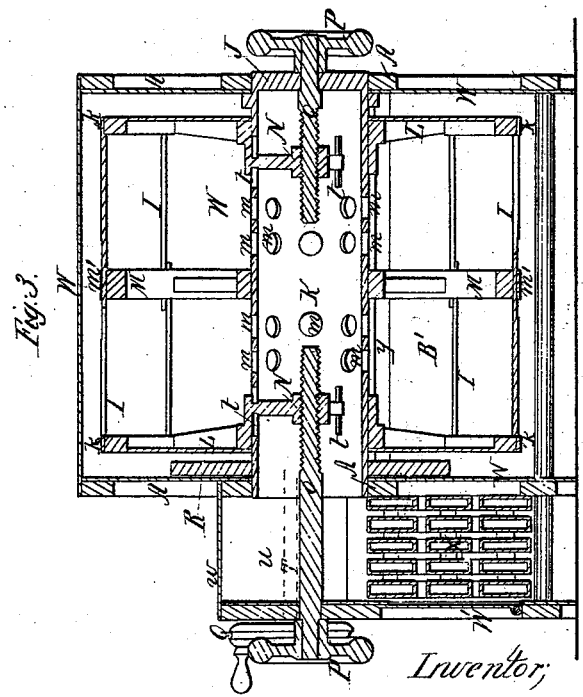
Witnesses
Thos. H. Dodge
Chas. H. Burleigh
Inventor;
Andre Avery Sheet 2-2 Sheets.
A. Avery.
Stretching and Drying Cloth.
N° 94,166. Patented Aug. 24, 1869.
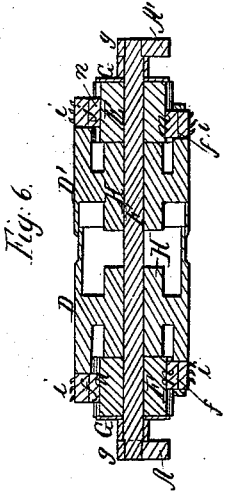
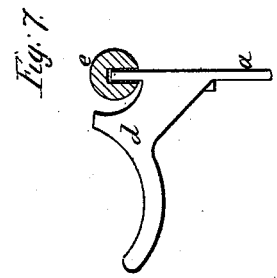
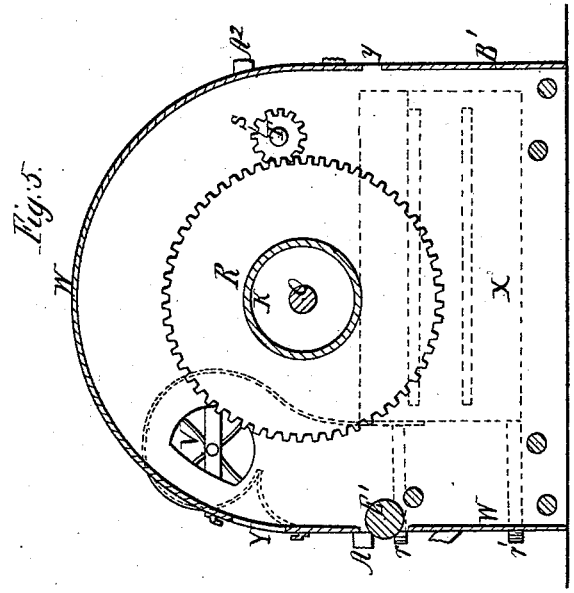
Witnesses,
Thos. H. Dodge
Chas. H. Burleigh
Inventor,
Andre Avery

United States Patent Office.

ANDRE AVERY, OF WORCESTER, MASSACHUSETTS.

Letters Patent No. 94,166, dated August 24, 1869.

IMPROVEMENT IN CLOTH-TENTERING AND DRYING-MACHINE.

The Schedule referred to in these Letters Patent and making part of the same.

*Know all men by these presents:*

That I, ANDRE AVERY, of the city and county of Worcester, and Commonwealth of Massachusetts, have invented certain new and useful Improvements in Cloth-Drying and Tentering-Machines; and I do hereby declare that the following is a full, clear, and exact description of the same, reference being had to the accompanying drawings, forming a part of this specification, in which—

Figure 1 represents a front view of my improved drying and tentering-machine;

Figure 2 represents an end view of my improved drying and tentering-machine;

Figure 3 represents a longitudinal central section on line A B, fig. 2;

Figure 4 represents a transverse section on line C D, fig. 1;

Figure 5 represents a transverse section on line E F, fig. 1;

Figure 6 represents a longitudinal section of the feed-cylinders on line G H, fig. 2; and Figure 7 represents a transverse section of the feed-bar.

To enable those skilled in the art to which my invention belongs, to make and use the same, I will proceed to describe it more in detail.

In the drawings—

The part marked A is the main frame of the machine, constructed of metal, or any other suitable material.

From the main frame A, at the front of the machine, project brackets A', for supporting the feeding-devices, consisting of the feed-bar C, feed-cylinders D D', feed-rolls E E, and stretcher-blocks f.

The feed-bar C is a round bar of wood or metal, arranged across the front of the machine, with its ends fixed to the outer extremities of the brackets A'.

Near each of its ends, at its under side, are formed longitudinal slots, in which are arranged the top ends of spring-pressure guide-levers d, in such a manner as to allow them to move freely along the slots.

The lower ends of the guide-levers a are secured to the floor by hinges b, and they are also furnished with projecting arms c, to which are attached springs e.

The lower ends of said springs being secured to the floor, they act upon the guide-levers a by their contracting force, and tend to draw the top ends of said levers, together with the stretcher-block guides d, which are fixed thereto, toward each other.

The guides d extend under the feed-rolls E, and are for the purpose of bringing the stretcher-blocks nearer together as they pass around the under side of the rolls E.

The feed-rolls E are hung and revolve upon a stationary shaft, F, that extends across between the brackets A', upon which it is supported by bearings g.

In the face of the feed-rolls E, are longitudinal grooves, the edges thereof being formed with under-bevels or flanges, to receive the dovetailed or flanged bottoms n of the stretcher-blocks f, which can slide freely back and forth in the grooves, while at the same time they are retained upon the face of the rolls.

The stretcher-blocks are prevented from sliding out at the end of the grooves by plates G, secured to the ends of the rolls, and having projections at their edges, against which the blocks strike when moved to the ends of the grooves.

The plates G are so arranged that they can be turned to move the projections away from the grooves, for the purpose of detaching the stretcher-blocks, when desired, or, if preferred, the rolls may be made without the plate G.

The stretcher-blocks f are constructed of metal, or other suitable material, furnished with flanged or dovetailed bottoms n, to fit the grooves in the feed-rolls, and covered with card-clothing, having short points i, that are arranged with an inclination outward, in order to retain firm hold of the cloth while stretching it.

The inner sides of the blocks f rest against the ends of the feed-cylinder D D', by means of which, in combination with the guides d, the stretcher-blocks f are operated.

The feed-cylinder D D' is secured to the shaft F, and, with the shaft, remains stationary. It is composed of two parts, D and D', one of which is fitted to slide inside the other, as indicated in the drawings, fig. 6.

Each part is furnished with a hub, H, that fits upon the shaft F, to which they are secured by screws.

The feed-cylinder is made wider at the top than at the bottom, so that the stretcher-blocks f, in passing up its front side and over the top, are caused to recede from each other, in order to stretch the cloth to an equal width; and in passing around the under side, are, by the guides d, again brought together, which disengages the points i from the cloth, and brings them into proper position to take a renewed hold.

Through the central part of the machine, there extends a hollow cylinder, K, supported at its ends by bearings upon the main frame A.

The cylinder K is closed at one end by the head J, the other end being left open for the passage of the heated air, while perforations or holes m are formed around the central part of the cylinder K, to allow the air to pass out of said cylinder and through the cloth.